United States Patent [19]
Borras

[11] Patent Number: 5,175,872
[45] Date of Patent: Dec. 29, 1992

[54] COMBINED TRUNKED/CELLULAR COMMUNICATION UNIT

[75] Inventor: Jaime A. Borras, Hialeah, Fla.

[73] Assignee: Motorola, Inc., Schaumburg, Ill.

[21] Appl. No.: 676,491

[22] Filed: Mar. 28, 1991

[51] Int. Cl.⁵ .............................................. H04B 1/40
[52] U.S. Cl. .................................... 455/76; 455/33.1; 455/84; 455/89; 379/59
[58] Field of Search ...................... 455/33.1, 72, 76, 77, 455/89, 183.1, 183.2, 191.1, 260, 78, 82, 84, 86, 87; 379/58, 59

[56] References Cited

U.S. PATENT DOCUMENTS

| | | | |
|---|---|---|---|
| 4,627,099 | 12/1986 | Shimahata | 455/76 |
| 4,802,235 | 1/1989 | Treatch | 455/76 |
| 4,876,741 | 10/1989 | Jacobs et al. | 455/72 X |
| 5,020,092 | 5/1991 | Phillips et al. | 379/59 |

OTHER PUBLICATIONS

System Saber Securenet Service Manual, Motorola, Inc. (1990).

Primary Examiner—Reinhard J. Eisenzopf
Assistant Examiner—Chi H. Pham
Attorney, Agent, or Firm—Pablo Meles; Michael J. Buchenhorner

[57] ABSTRACT

A communication unit (10), capable of operating in either cellular or trunked communication modes, comprises a receiver (14), a transmitter (16), and a dual synthesizer (18), coupled to the receiver and to the transmitter. The dual synthesizer comprises a main synthesizer (124) and an offset synthesizer (132). The offset synthesizer comprises a phase modulator (131) and an offset voltage-controlled oscillator (134). A protocol controller (20) comprises modulator circuitry for modulating only the offset voltage-controlled oscillator when communication unit operates in the cellular mode, and for modulating both the phase modulator and the offset voltage-controlled oscillator when the communication unit operates in the trunked mode.

9 Claims, 5 Drawing Sheets

COMBINED TRUNKED/CELLULAR COMMUNICATION UNIT

TECHNICAL FIELD

This invention relates generally to trunked communication systems and to cellular communication systems, and more specifically to communication units for use in trunked and cellular communication systems.

BACKGROUND

The basic operation and structure of cellular and trunked communication are known. In trunked communication systems, a central resource controller allocates a limited number of channels (i.e., resources) among many communication units (e.g., subscribers in a trunked communication system) based on channel availability. For example, radios used as communication units in a trunked system are operative on a number of frequencies, which are assigned to each communication unit based on availability. Trunked communications systems typically comprise a communication resource controller, a plurality of repeaters, and a plurality of communication units which may be mobile vehicle radios or portable radios. Typical trunked communication systems have a relatively large geographic coverage.

A cellular communication system typically comprises a mobile telephone switching office, a limited number of communications channels, and a plurality of communications units that may be cellular telephones. Each of the plurality of cells comprises some of a limited number of communication channels, wherein one of the communication channels is designed for that cell. The control channel transceives operational information between the plurality of communication units within the cell and the mobile telephone switching office such that the communication units can place calls via a telephone system. The coverage area of each typical cell is relatively small in comparison with that of a typical trunked system.

Because of the different configurations of trunked and cellular communications systems, a typical communication unit, without two receivers and two transmitters cannot operate on both systems. Having two receivers and two transmitters adds expense to the manufacture of the unit, and accordingly a more expensive communication unit results. Presently, the United States Federal Communications Commission has designated the frequency range of 806 to 825 MHz as transmit frequencies and 851 to 870 MHz as receive frequencies for trunked communications systems, and 825 to 845 MHz as the transmit frequencies, and 870 to 890 MHz as receive frequencies for cellular communications systems. However, known communication units with one receiver and one transmitter are limited to operating in either one system or the other. Therefore, a need exists for a communication unit having one receiver and one transmitter that can alternately operate in either a cellular or a trunked communication system.

If one were to combine cellular and trunked modes in a communication device having a single receiver and a single transmitter, problems would arise due to the wide frequency range of operation. One such problem is the frequency synthesizer voltage-controlled oscillator (VCO) linearity. As the range of the control voltage of the VCO increases the synthesizer may begin to operate outside of its linear region. This is a problem because operation within the linear region is desirable for good performance. An additional problem arises in relation to the audio processing required for operation in the cellular mode. Cellular operation requires that the audio be expanded and compressed to overcome the problem of fading encountered at cellular radio frequencies. Another problem arises from the different protocols used in cellular and trunked communication systems.

SUMMARY OF THE INVENTION

Briefly, according to the invention, a communication unit capable of operating in either cellular or trunked communication modes comprises a receiver; a transmitter, a dual synthesizer, coupled to the receiver and to the transmitter, and a protocol controller. The dual synthesizer comprises a main synthesizer and an offset synthesizer. The offset synthesizer comprises a phase modulator and an offset voltage-controlled oscillator. The protocol controller comprises modulator circuitry for modulating only the offset voltage-controlled oscillator when communication unit operates in the cellular mode, and for modulating both the phase modulator and the offset voltage-controlled oscillator when the communication unit operates in the trunked mode.

DETAILED DESCRIPTION OF THE PREFERRED EMBODIMENT

Figure 1:
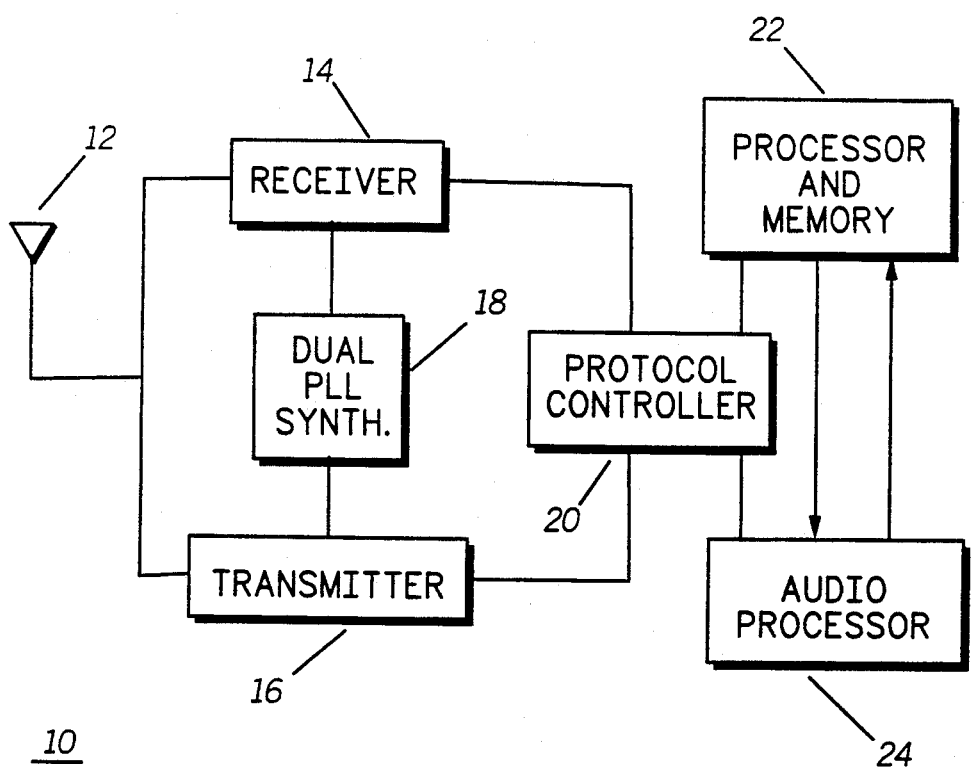
FIG. 1 is a block diagram illustrating an embodiment of the invention.

Referring to FIG. 1, a block diagram illustrating a communication device 10 in accordance with the invention is shown. The communication device 10, includes an antenna 12 for receiving and transmitting radio frequency (RF) signals, a receiver 14, and a transmitter 16. A dual phase locked loop (PLL) synthesizer 18 is coupled to both the receiver 14 and the transmitter 16 to provide injection signals for mixers within both the receiver 14 and the transmitter 16 so that the communication unit may operate in both cellular and trunked modes, in accordance with the invention. A protocol controller 20 is used to split combined audio and data signals received by the communication device 10 into separate paths. A processor and memory 22 is used to select the mode of operation (i.e. whether the communication unit operates in a cellular or a trunked mode) and to program the frequency synthesizers dividers in both the receiver 14 and the transmitter 16. A dual service audio processor 24 is used to process audio (both received and to be transmitted). In the cellular mode, audio processing is required to overcome the Rayleigh fading problem. The audio processor 24 performs performs a syllabic companding function to improve the voice transmission quality by expanding and compressing the audio signals.

Figure 2:
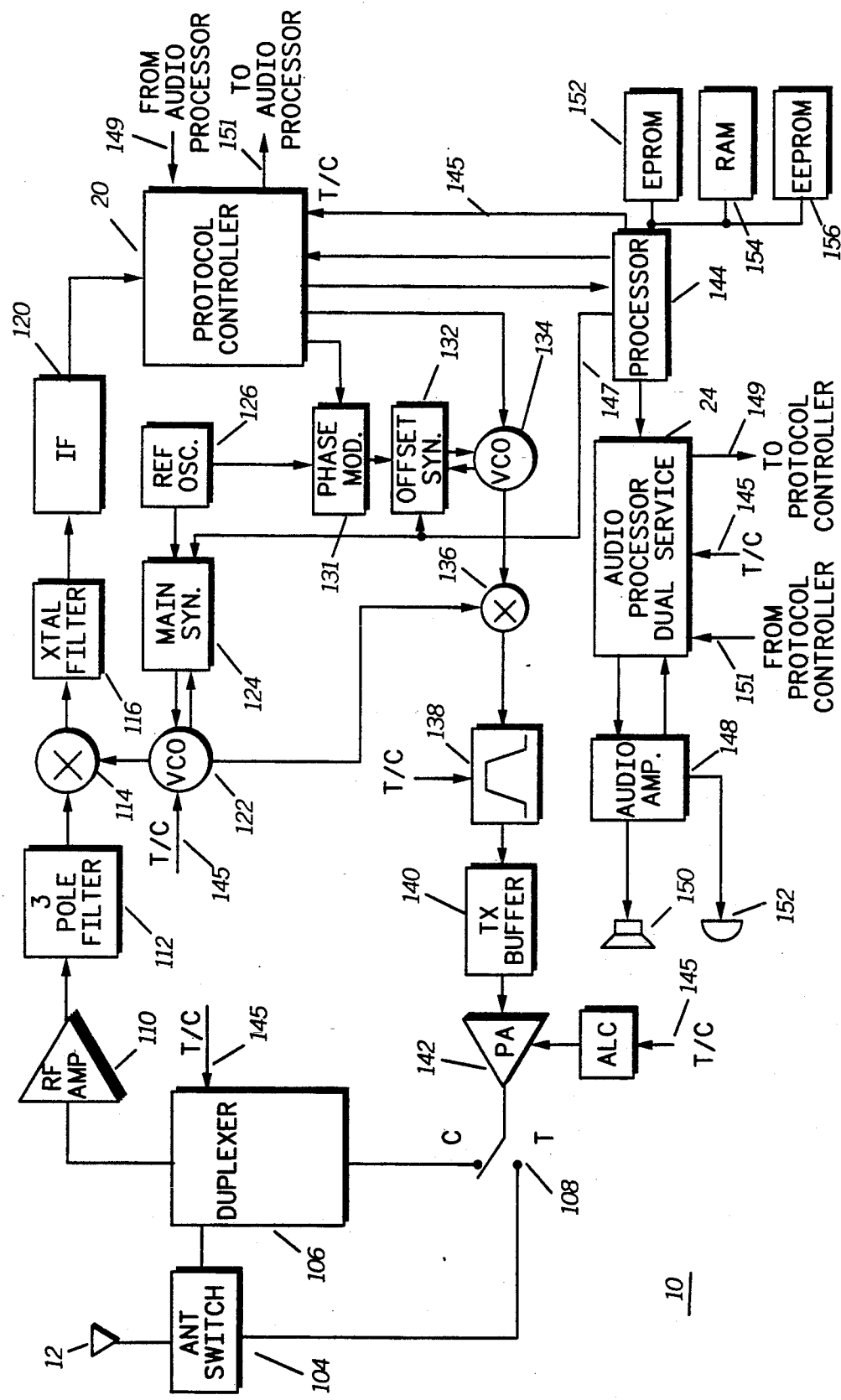
FIG. 2 illustrates an embodiment of the invention.

Referring now to FIG. 2, a more detailed illustration of the communication device 10 is shown. The receiver path includes an RF amplifier 110, a bandpass filter 112, a down mixer 114, a crystal filter 116, and a conventional intermediate frequency (IF) section 120. The transmitter path includes a bandpass filter 138, a transmitter buffer 140, and a power amplifier 142. A switch 108 is disposed between the antenna switch 104 and the power amplifier 142. The switch can be either in the position T for trunked mode operation or in the position C for cellular operation. The dual PLL synthesizer 18 of FIG. 1 includes a main synthesizer 124, a main VCO 122, a phase modulator 131, an offset synthesizer 132, and an offset VCO 134, which is coupled to mixer 136. A reference oscillator 126 provides the reference waveform for both synthesizers.

OPERATION IN THE TRUNKED MODE

When a user of the communication device operates the communication unit 10 in the trunked mode, the processor 144 provides a T/C control signal 145 indicating, in this case, that the trunked communication mode has been selected. In the trunked mode, the duplexer 106 is bypassed (however, the received trunked-mode signals are still passed to the RF amplifier 110). Therefore, the communication unit 10 operates in a simplex mode. When the antenna switch 104 is in the receive position (e.g., a push-to-talk switch is not pressed), an RF signal (having a frequency of 851 MHz for example) received at antenna 12 is amplified by the RF amplifier 110 and then filtered by a 3-pole filter 112 before being applied to a down mixer 114. The T/C signal 145 causes the voltage controlled oscillator (VCO) 122 to produce an injection signal with a frequency in the range of 896 Mhz to 915 MHz (corresponding to the trunked mode). The down mixer 114 heterodynes the received RF signal with the main injection waveform (having a frequency of 896 MHz, in this example) to produce a signal having both sum and difference components. The bandpass crystal filter 116 (with the center frequency at 45 MHz) then passes only the difference component (having a frequency approximately equal to 45 MHz) to the conventional IF section 120. The IF section 120 (which includes a 455 KHz filter) performs a second conversion, and provides the resulting baseband audio and data signal to the protocol controller 20. The protocol controller 20 separates the baseband signal into separate paths, and then provides an audio signal 151, in accordance with the appropriate protocol, to the dual service audio processor 24. The audio processor performs any processing that may be required before the signal is presented to the user of the communication unit 10. The audio amplifier 148 then amplifies the processed signal before it is applied to the speaker (or earpiece) 150.

The VCO 122 is locked to the required frequency by means of the main synthesizer 124 which receives the reference waveform from reference oscillator 126. The frequency of the signal set by the synthesizer 124 is determined by the processor 144 (as a function of the operating mode). Selection of operating mode may be either manual (e.g., via a keypad), or in response to a protocol.

When the user presses the PTT switch (not shown) of the communication unit 10 (while still in the trunked mode) the antenna 12 is connected to the amplifier 142 for transmission of signals via the switch 108. The processor 144 causes the offset PLL to lock the offset VCO onto a frequency 90 MHz so that an offset injection signal having that frequency is provided to the up mixer 136. In the trunked mode of operation, the protocol controller 20 selects a trunked communication protocol, and provides modulating signals to both the phase modulator 131 and the offset VCO 134. The up mixer 136 receives an 896 MHz injection signal (in this example) from the main VCO 122, and the modulated (90 MHz) signal from the offset VCO 134 to produce an output signal of 806 MHz. Thus, a signal is provided that includes a component within the trunked transmission range.

A switchable bandpass filter 138 (preferably a stripline type filter in which the frequency is adjusted by changing internal inductance in accordance with the signal 145 received from processor 144) filters the output signal from the up mixer 136 to remove components outside of the desired transmission frequency range. The output of the bandpass filter 138 is then applied to a transmit buffer 140 which takes the signal from the filter 138, amplifies it and isolates reflections from the antenna to avoid pulling VCOs 122 or 134 off their respective frequencies. A power amplifier 142 then amplifies the output of the transmit buffer to a level suitable for transmission. An automatic level controller (ALC) 146 keeps the output level of the power amplifier 142 at a constant level independent of antenna impedance variations. The ALC 146 receives the signal 145, from the processor 144, indicating whether the communication device 10 is in a trunked or cellular communication mode so that the power amplifier level is adjusted accordingly (generally, a higher level is required for the trunked mode). In the trunked mode operation, the antenna switch 104 is connected to the power amplifier 142 via switch 108 so that the output of the power amplifier may be transmitted by the antenna 102.

OPERATION IN THE CELLULAR MODE

When the unit 10 is selected to operate in the cellular mode, processor 144 provides a T/C signal 145 indicating that the communication unit 10 is in the cellular mode. In the cellular mode, a biphase Manchester bit-encoding format is used. Since the frequency spectrum of biphase coding has no low frequency components (below the offset loop bandwidth), the offset loop reference frequency phase modulator 131 is not used. Therefore, modulation of the offset VCO 134 is all that is required. Thus, the protocol controller 20 now modulates only the offset VCO 134. The offset synthesizer 132 locks the modulated signal at the offset frequency required for transmission. Thus, the same dual synthesizer is used for both the cellular and trunked modes.

In this mode, the duplexer 106 is activated, thus converting the communication unit 10 into a duplex communication unit. Thus, when an audio signal is received at the microphone 152, it is amplified by an audio amplifier 148 and applied to the audio processor 24 which compresses the microphone output audio for transmission, and expands audio received by the communication unit 10 for presentation to a listener (in a manner that is well known in the art) to avoid or overcome fading problems encountered at cellular system frequencies. The audio processor 24 then provides a processed signal 149 (representing the audio signal received at the microphone 152) to the protocol controller 20. As discussed above, the protocol controller 20 modulates the offset VCO 134 so that it provides the information-carring signal to the up mixer 136 for conversion to the appropriate transmission frequency. For example, if the transmission is desired to be 826 MHz, the VCO 122 is set to provide an injection signal of 916 MHz, so that when mixed with the 90 MHz offset VCO frequency it produces a component on the cellular band (826 MHz) which is passed by the filter 138, amplified by amplifier 142, and transmitted by antenna 12.

When an RF signal is received at the antenna 12 during cellular operation, the receiver portion of the communication unit 10 operates in a manner that is substantially the same as during trunked operation, except that the protocol controller now performs in accordance with cellular protocols. Moreover, since the received RF signal is modulated with compressed audio information, the audio processor 24 must expand the audio 151 provided by the protocol controller 20, before presentation to a listener. For example, if the RF signal received has a frequency of 871 MHz, the mixer 114 heterodynes it with a 916 MHz injection waveform. A 45 MHz IF signal results from filtering by filter 116.

The processor 144 is preferably a microprocessor such as Model No. 68HC11 manufactured by Motorola, Inc. The processor 144 is coupled to an erasable programmable read only memory (EPROM) 152 containing internal firmware required for the operation of the communication device 10. The processor 144 is also coupled to a random access memory (RAM) 154 providing a scratch pad for the communication device 10. The processor 144 is further coupled to an electrically erasable programmable read only memory (EEPROM) which provides customer driven information for the communication unit 10.

Figure 3:
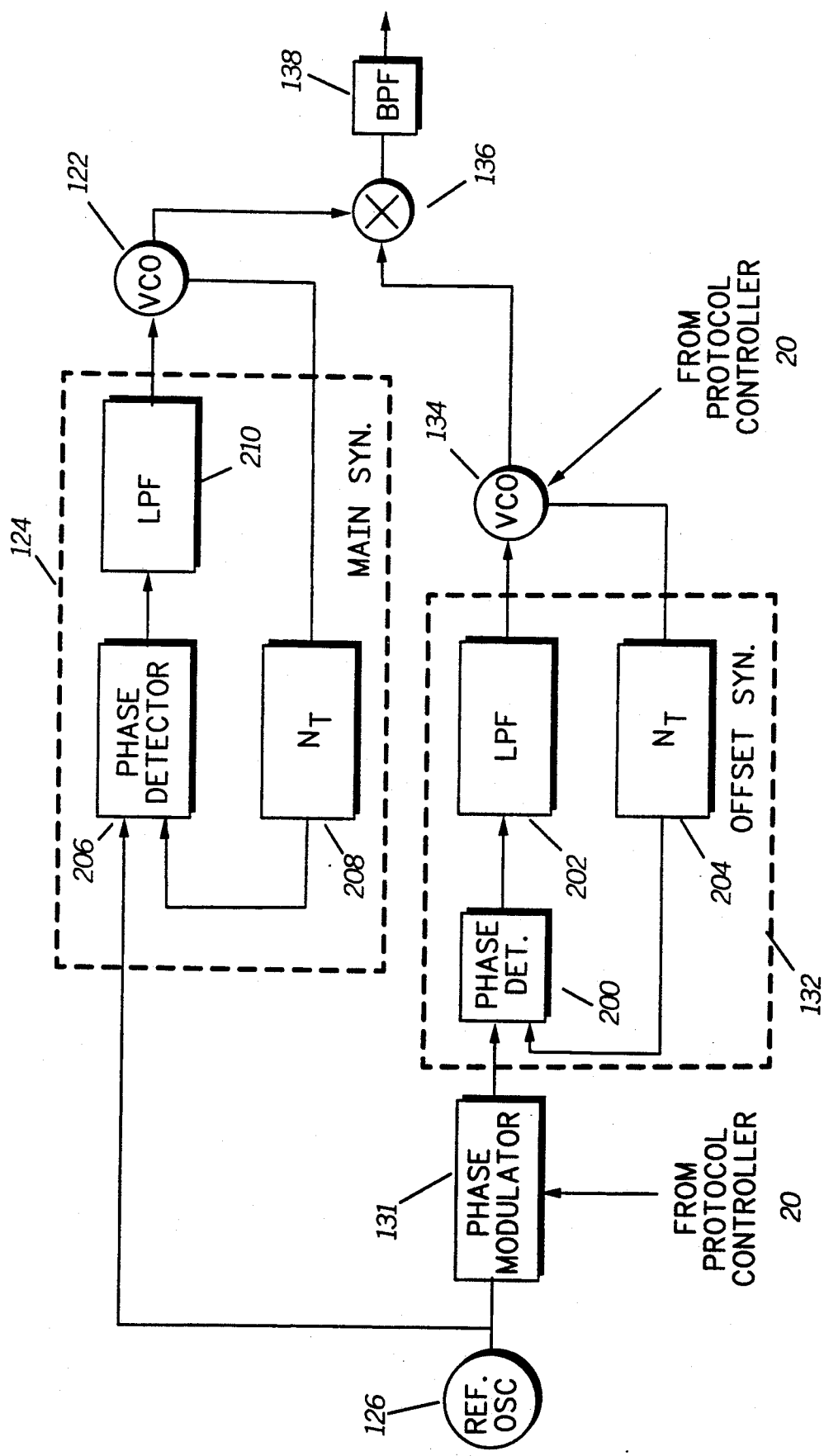
FIG. 3 is a block diagram of a dual phase locked loop synthesizer in accordance with the invention.

Referring to FIG. 3, a dual synthesizer in accordance with the invention is shown. The main PLL is of a conventional design and includes a conventional phase detector 206, a conventional low pass filter 210, and a divider 208. The offset PLL 132 includes a conventional phase detector 200, a conventional low-pass filter 202, and a conventional divider 204. The divisors ($N_t$) of the dividers 208 and 204 are set by the processor 144 in accordance with the selected modes. The protocol controller 20 modulates both the phase modulator 131 and the VCO 134 in the trunked mode. This is required because in the trunked mode, the frequency of the data can be as low as a few Hertz. Therefore the reference port (i.e., the phase detector) must be modulated, as well as the VCO 134, to obtain a flat frequency response (i.e., the frequencies below and above the loop bandwidth will not be attenuated). In the cellular mode, only the VCO 134 must be modulated because of the biphase characteristics of the Manchester coding employed. Hence there is no low frequency data and no need to modulate the reference port of the offset PLL. An additional advantage of Manchester coding is that the modulation is performed at a constant frequency of 90 MHz, so the control voltage can be set to remain in the linear region of VCO 134. Therefore, by using the dual synthesizer in accordance with the invention, the communication device 10 can operate in both cellular and trunked modes without requiring two receivers and two transmitters.

Figure 4:
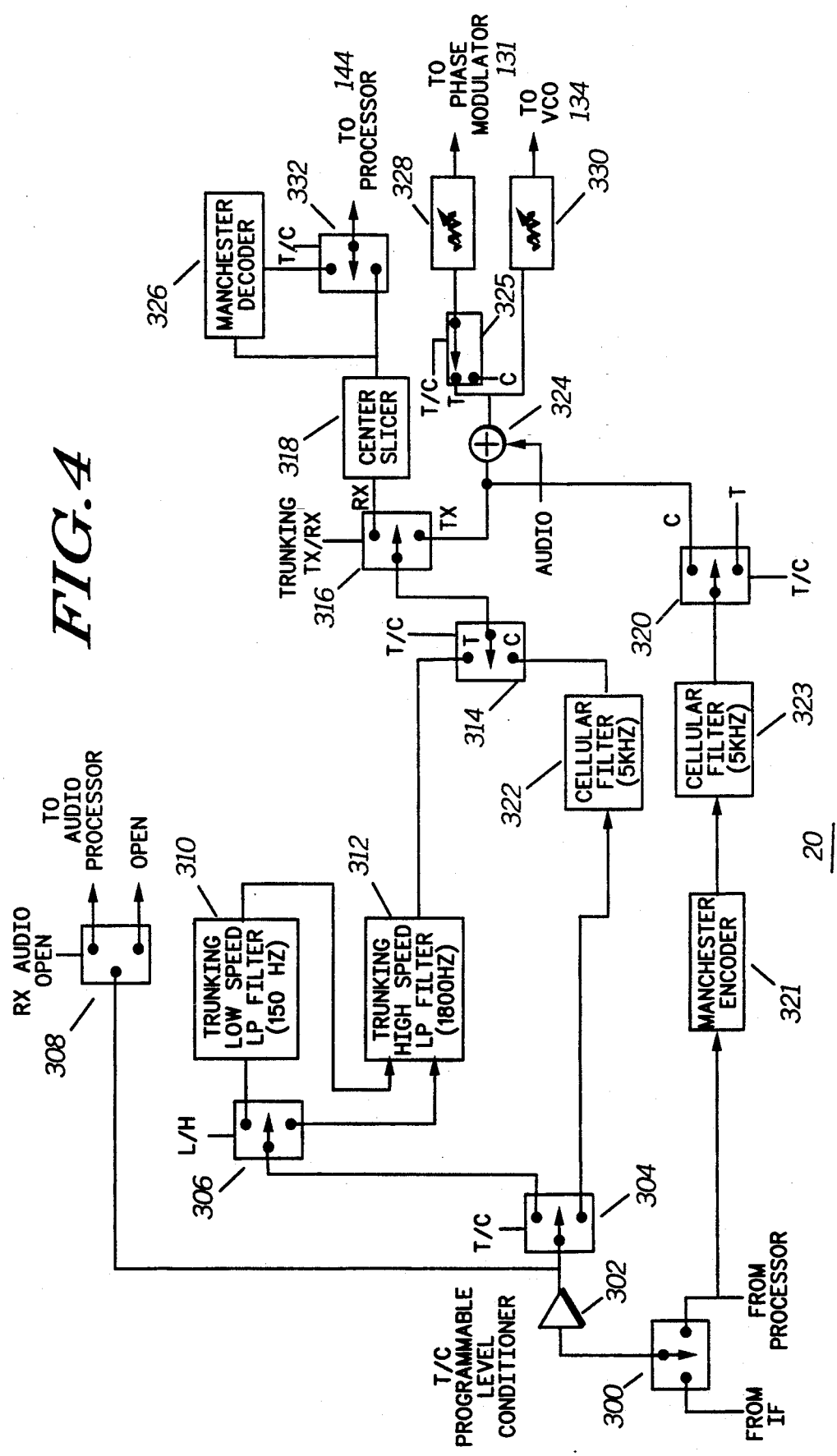
FIG. 4 is a block diagram of a protocol controller in accordance with the invention.

Referring to FIG. 4, a block diagram of a protocol controller in accordance with the invention is illustrated. In the receive mode, the processor 144 places the switch 300 is in the "receive" position. Thus, the audio output of the IF section 120 is applied to the switch 300, and passed to a programmable level conditioner 302. The programmable level conditioner 302 provides variable gain and attenuation to compensate the difference in the deviation of the cellular and trunked systems. Switch 304 has two positions—one for the trunked mode, and the other for the cellular mode.

When the communication unit is in the trunked/receive mode, the received audio signal is split into an audio portion and a data portion. The audio portion is applied to the audio processor 24 via switch 308, and the data portion is applied to a switch 306. There are two speeds for data in the trunked mode—low and high speed. Low speed is used in the "talk" mode and high speed is used in the "data" mode. The low speed data is applied to both the trunking low speed low pass filter 310 and the trunking high speed low pass filter 312, via switch 306, and the high speed data is applied only to the high speed low pass filter 312. The low speed data filter 310 and the high speed data filter 312 filter any data stream to avoid high frequency noise. The filtered data stream is then applied to a center slicer 318 via the switches 314 and 316. The center slicer 318 is a conventional circuit which receives the output of filters 310 and 312 to provide a square wave suitable for the processor 144.

In the transmit/trunked mode, switch 300 connects the processor 144 to the level conditioner 302. The processor provides the data signal, to be transmitted, to the protocol controller 20. The level of the data signal is conditioned (302) and applied to the filters 310 and 312 in a manner similar to that followed in the receive mode. Upon arrival at switch 316, the transmit data signal is applied to the summer 324 for summing with any transmit audio present at the audio input of the summer. The potentiometers 328 and 330 adjust the level of the combined data and audio transmit signal for application to the phase modulator 131 and VCO 134, respectively for modulation thereof. Potentiometers 328 and 330 are electronically controlled by processor 144 and adjusted to the required values preprogrammed in the EEPROM 156 to meet the respective system requirements.

In the cellular mode, switch 304 connects the level conditioner 302 to the cellular filter 322. During cellular reception, receive signals are conditioned at the level conditioner 302, and applied to a cellular filter 322 which rounds off the high frequency noise in the channel. The receive signal is then applied to the center slicer 318, and to the Manchester decoder 326. The resulting decoded signal is then applied to the processor 144.

During cellular transmission, the transmit signal is received from the processor 144. The transmit signal is applied to a Manchester encoder 321. The encoded signal is the applied to the cellular filter 323, and through switch 320 to be summed with audio at summer 324. In the cellular mode switch 325 is open, thus the modulating signal is provided only to the VCO 134.

Figure 5:
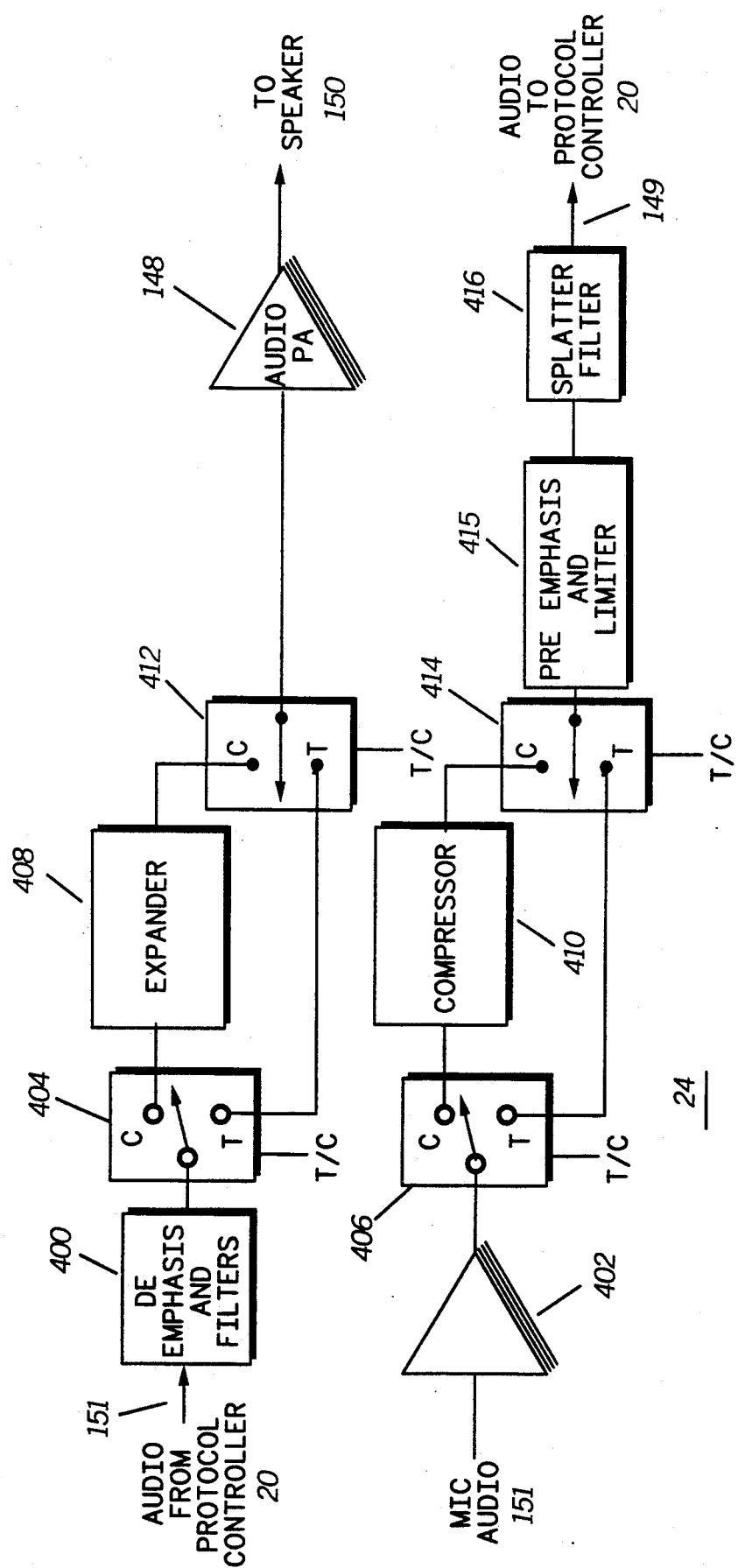
FIG. 5 is a block diagram of an audio processor in accordance with the invention.

Referring to FIG. 5, a block diagram of the audio processor 24 in accordance with the invention is shown. Receive audio 151 from the protocol controller 20 is applied to the de-emphasis and filters circuit 400, and transmit audio from microphone 152 is applied to the amplifier 402. The de-emphasis and filter circuit 400 is a conventional circuit that rolls off all high frequency components.

In the trunked mode, the output of the de-emphasis and filter circuit 400 is directly applied to the audio PA 148. In the trunked/transmit mode, the transmit audio is applied to the pre-emphasis and filter circuit 415 for pre-emphasis of the high frequency components of the audio signal and limiting of the audio. The pre-emphasized signal is passed through splatter filter 416 so that interference with adjacent and alternate channels is decreased. The resulting signal is applied to the protocol controller 20 for modulation of the VCO 134, and phase modulator 131.

In the trunked/receive mode, the de-emphasized and filtered signal is applied to the audio PA for presentation to a listener via the speaker 150.

In the cellular mode, the switch 404 connects the de-emphasized and filtered signal to the expandor 408 for expansion and the switch 412 connects the expandor 408 to the audio amplifier 148, so that the audio signals may be presented to a listener. Moreover, switch 406 connects the amplifier 402 to the compressor 410, and switch 414 connects the compressor 410 to the pre-emphasis and limiter circuit 414 so that the compressed, pre-emphasized and limited signal may be applied to the protocol controller 20. Accordingly, the audio processor may be used in either a cellular or trunked mode.

What is claimed is:

1. A communication unit for operating in trunked and cellular modes, comprising:
   receiver means, for receiving RF signals;
   transmitter means for transmitting RF signals;
   dual synthesizer means, coupled to the receiver means and to the transmitter means, the dual synthesizer means comprising a main synthesizer and an offset synthesizer;
   the offset synthesizer comprising phase modulator means and an offset voltage-controlled oscillator; and
   a protocol controller, coupled to the receiver means and to the transmitter means, comprising modulator means for modulating only the offset voltage-controlled oscillator when communication unit operates in the cellular mode, and for modulating the phase modulator and the offset voltage-controlled oscillator when the communication unit operates in the trunked mode.

2. The communication unit of claim 1, further comprising a processor, coupled to the protocol controller, for providing control signals for selecting the mode of operation for the communication unit.

3. The communication unit of claim 2, further comprising audio processor means, coupled to the protocol controller, and to the processor, for selectively expanding and compressing audio signals received at the transmitter means only during operation in the cellular mode.

4. The communication unit of claim 3, further comprising duplexer means, coupled to the receiver means and to the transmitter means, for operation in the cellular mode.

5. The communication unit of claim 4, further comprising bypass means for bypassing the duplexer means during operation in the trunked mode, the bypass means being coupled to the receiver means and to the transmitter means.

6. A communication unit for operating in trunked and cellular modes, comprising:
   receiver means, for receiving RF signals;
   transmitter means for transmitting RF signals;
   dual synthesizer means, coupled to the receiver means and to the transmitter means, for providing injection signals so that the communication unit can operate in both the cellular and trunked modes;
   processor means for selecting the mode of operation for the communication unit;
   protocol controller means, coupled to the processor means, for controlling modulation in accordance with the selected mode of operation; and
   audio processor means, coupled to the protocol controller and to the processor means, for selectively expanding and compressing audio signals only during operation in the cellular mode.

7. The communication unit of claim 6 wherein the dual synthesizer means comprises a main synthesizer and an offset synthesizer; and wherein the offset synthesizer comprises phase modulator means and an offset voltage-controlled oscillator.

8. The communication unit of claim 6 wherein the protocol controller comprises modulator means for modulating only the offset voltage-controlled oscillator when communication unit operates in the cellular mode, and for modulating the phase modulator and the offset voltage-controlled oscillator when the communication unit operates in the trunked mode.

9. A communication unit for operating in trunked and cellular modes, comprising:
   receiver means, for receiving RF signals;
   transmitter means for transmitting RF signals;
   dual synthesizer means, coupled to the receiver means and to the transmitter means, for providing injection signals so that the communication unit can operate in both the cellular and trunked modes, the dual synthesizer means comprising a main synthesizer and an offset synthesizer;
   the offset synthesizer comprising phase modulator means and an offset voltage-controlled oscillator; and
   a protocol controller, coupled to the receiver means and to the transmitter means, comprising modulator means for modulating only the offset voltage-controlled oscillator when communication unit operates in the cellular mode, and for modulating the phase modulator and the offset voltage-controlled oscillator when the communication unit operates in the trunked mode; and
   audio processor means, coupled to the protocol controller, for selectively expanding and compressing audio signals only during operation in the cellular mode.

* * * * *